(12) United States Patent
Mueller

(10) Patent No.: US 10,669,101 B2
(45) Date of Patent: Jun. 2, 2020

(54) ZERO TENSION SYSTEM CONVEYOR

(71) Applicant: Zero Tension System, LLC, Calera, OK (US)

(72) Inventor: Larry J. Mueller, Calera, OK (US)

(73) Assignee: Zero Tension System, LLC, Calera, OK (US)

( * ) Notice: Subject to any disclaimer, the term of this patent is extended or adjusted under 35 U.S.C. 154(b) by 0 days.

(21) Appl. No.: 16/355,129

(22) Filed: Mar. 15, 2019

(65) Prior Publication Data

US 2019/0210808 A1    Jul. 11, 2019

Related U.S. Application Data

(63) Continuation of application No. 15/850,390, filed on Dec. 21, 2017, now Pat. No. 10,246,262, which is a continuation of application No. 14/690,628, filed on Apr. 20, 2015, now Pat. No. 9,873,564, which is a continuation of application No. 13/670,399, filed on Nov. 6, 2012, now Pat. No. 9,010,528.

(60) Provisional application No. 61/556,445, filed on Nov. 7, 2011.

(51) Int. Cl.

| B65G 21/18 | (2006.01) |
|---|---|
| B65G 21/00 | (2006.01) |
| B65G 17/08 | (2006.01) |
| B65G 23/04 | (2006.01) |
| B65G 17/02 | (2006.01) |
| B65G 15/30 | (2006.01) |
| B65G 17/38 | (2006.01) |
| B65G 33/00 | (2006.01) |

(52) U.S. Cl.
CPC ............. B65G 17/02 (2013.01); B65G 15/30 (2013.01); B65G 17/38 (2013.01); B65G 21/18 (2013.01); B65G 23/04 (2013.01); B65G 33/00 (2013.01)

(58) Field of Classification Search
None
See application file for complete search history.

(56) References Cited

U.S. PATENT DOCUMENTS

| 3,664,487 | A | | 5/1972 | Ballenger |
|---|---|---|---|---|
| 4,951,807 | A | * | 8/1990 | Roinestad ............ B65G 17/064 198/778 |
| 5,141,102 | A | * | 8/1992 | Roinestad ............ B65G 17/064 198/778 |

(Continued)

*Primary Examiner* — Kavel Singh
(74) *Attorney, Agent, or Firm* — Garlick & Markison; Shayne X. Short

(57) ABSTRACT

Zero tension system conveyor. A conveyor belt is driven by at least a portion of the conveyor belt being in continuous contact with a block chain within at least a portion of an overall conveyor belt system. Such a conveyor belt system may be implemented in a spiral configuration such that a relatively small portion of the overall width of the conveyor belt is in contact with the block chain above and/or below the conveyor belt. The static force/weight of the conveyor belt in conjunction with the continuous contact between at least a portion of the conveyor belt and the block chain effectuates the driving of the conveyor belt through the overall conveyor belt system. The block chain is composed of a number of links, at least some of which include a respective hook/protrusion on one side thereof, for being directly engaged by drum bars implemented within a drum assembly.

20 Claims, 14 Drawing Sheets

(56) References Cited

U.S. PATENT DOCUMENTS

| | | | | |
|---|---|---|---|---|
| 5,191,267 A | * | 3/1993 | Machacek | B65G 21/18 |
| | | | | 198/778 |
| 6,564,930 B1 | | 5/2003 | Colding-Kristensen | |
| 6,793,062 B2 | * | 9/2004 | Hammock | A24C 5/35 |
| | | | | 198/347.1 |
| 7,331,445 B2 | * | 2/2008 | Roland | B65G 21/18 |
| | | | | 198/778 |

* cited by examiner

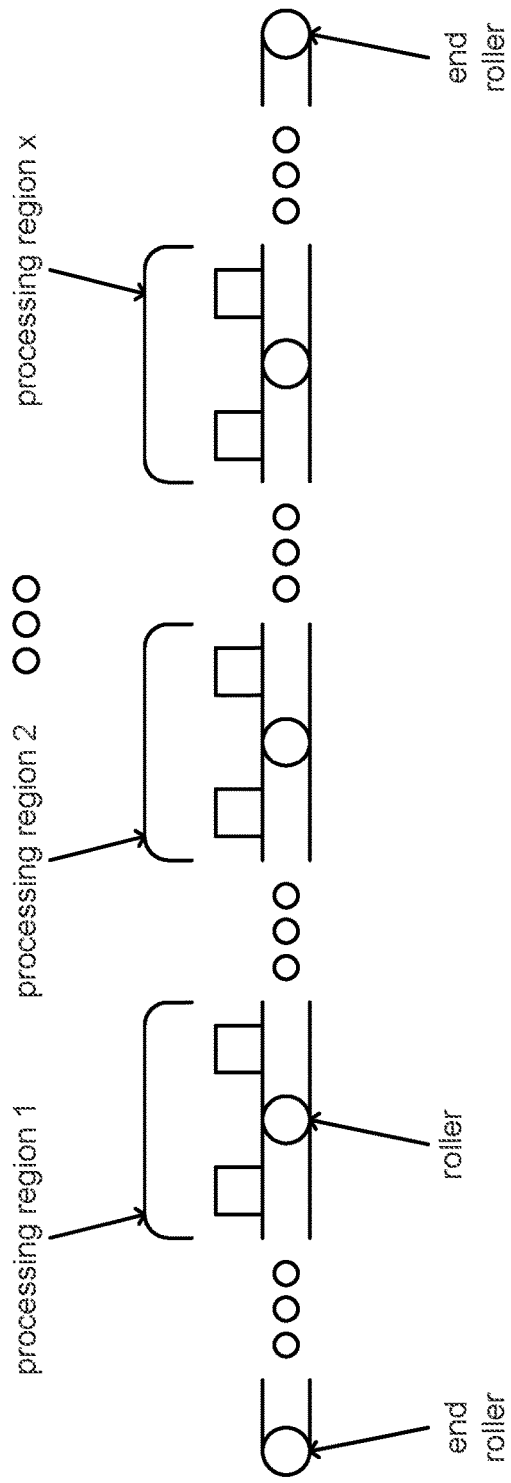
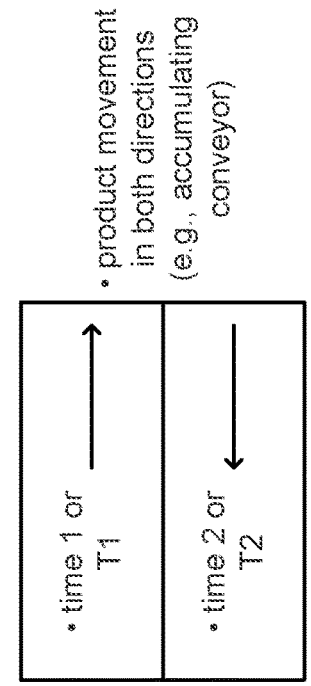
FIG. 2

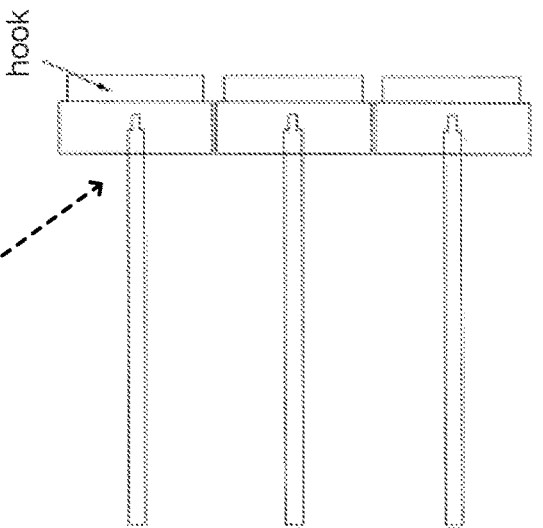

- combination of compression and mechanical engagement of belt with block chain

- may be centered, or anywhere within block chain link(s)

- link having receiver for conveyor belt edge (e.g., mechanically locking into block chain links)

- tab (e.g., between levels of stacked block chain)

- dovetail (e.g., between levels of stacked block chain)

- various conveyor belt options (e.g., edge options including mechanical interfacing/engagement with block chain)(spacer(s), if desired, to control/limit compression on conveyor belt [to allow or prevent slippage])

ZERO TENSION SYSTEM CONVEYOR

CROSS REFERENCE TO RELATED PATENTS/PATENT APPLICATIONS

The present U.S. Utility patent application claims priority pursuant to 35 U.S.C. § 120 as a continuation of U.S. Utility application Ser. No. 15/850,390, entitled "Zero tension system conveyor," filed Dec. 21, 2017, pending, and scheduled to issue as U.S. Pat. No. 10,246,262 on Apr. 2, 2019, which claims priority pursuant to 35 U.S.C. § 120 as a continuation of U.S. Utility application Ser. No. 14/690,628, entitled "Zero tension system conveyor," filed Apr. 20, 2015, now issued as U.S. Pat. No. 9,873,564 B2 on Jan. 23, 2018, which claims priority pursuant to 35 U.S.C. § 120 as a continuation of U.S. Utility application Ser. No. 13/670,399, entitled "Zero tension system conveyor," filed Nov. 6, 2012, now issued as U.S. Pat. No. 9,010,528 B2 on Apr. 21, 2015, which claims priority pursuant to 35 U.S.C. § 119(e) to U.S. Provisional Application No. 61/556,445, entitled "Zero tension system conveyor," filed Nov. 7, 2011, all of which are hereby incorporated herein by reference in their entirety and made part of the present U.S. Utility patent application for all purposes.

BACKGROUND OF THE INVENTION

Technical Field of the Invention

The invention relates generally to conveyor systems; and, more particularly, it relates to conveyor systems for moving any of a number of types of products, articles of manufacture, etc. such as along one or more conveyor belts.

Description of Related Art

Conveyor systems, such as those that include a conveyor belt, have been in use and under continual development for many years. The applications within which such conveyor systems may be implemented are varied, including food production, packaging, product assembly, etc. Generally speaking, such conveyor systems may be implemented in any of a variety of different contexts for any of a variety of different purposes.

Within many prior art conveyor systems, the conveyor belt therein is driven by friction against the drum bars with one or more driving rollers, against support frames extending from a drive assembly underneath the conveyor belt, or in accordance with some other frictionally based drive mechanism. For example, considering an implementation of an endless conveyor system (i.e., a conveyor system having a conveyor belt whose ends are attached) is driven by friction between the conveyor belt and the drum bars with one or more rollers that are physically in contact with the conveyor belt. As may be understood with respect to such prior art systems, a great deal of tension must be maintained in the conveyor belt to ensure appropriate contact between these one or more driving rollers and the conveyor belt, in that, the belt is driven through friction between the driving components and the conveyor belt itself.

The deficiencies of prior art conveyor systems are many. For example, because of the very high tension that must be maintained in accordance with the frictional engagement and driving of the conveyor belt, there can be significant wear and tear on the conveyor belts within such systems. For example, in an effort to deal with the wear and tear particularly introduced by such a frictionally driven system, additional consideration must often be made in regards to the interfacing of the conveyor belts to components within the conveyor belt system (e.g., including employing protective plastic caps, strips, and other materials in efforts to minimize the rate of degradation of the conveyor belt).

Because of this significant degradation in conveyor belt integrity, it may be understood that such conveyor belts need to be replaced to ensure appropriate operation of the overall system. During such maintenance, such as the replacement of the conveyor belt within the system, the system is clearly inoperable resulting in a great deal of downtime, loss of productivity, increased operating costs, etc. Moreover, in certain applications, such as those related to food processing and/or production, the prior art designs are unfortunately quite susceptible to various food products being trapped and caught within various portions of the overall system, which can compromise sanitation, cleanliness, product quality, etc. (e.g., often-times directly as a result of additional considerations that are made in efforts to minimize the rate of degradation of the conveyor belt, including employing protective plastic caps, strips, and other materials). To deal with such deficiencies, such prior art conveyor systems typically undergo a shutdown and maintenance operation during which, again, the system is clearly inoperable resulting in a great deal of downtime, loss of productivity, increased operating costs, etc. The prior art does not presently provide any solution by which such deficiencies and problems may be avoided.

BRIEF DESCRIPTION OF THE SEVERAL VIEWS OF THE DRAWINGS

FIG. 2 illustrates an embodiment of a conveyor belt system implemented with separate processing regions.

FIG. 13 illustrates an embodiment of various conveyor belt options.

DETAILED DESCRIPTION OF THE INVENTION

Figure 1:
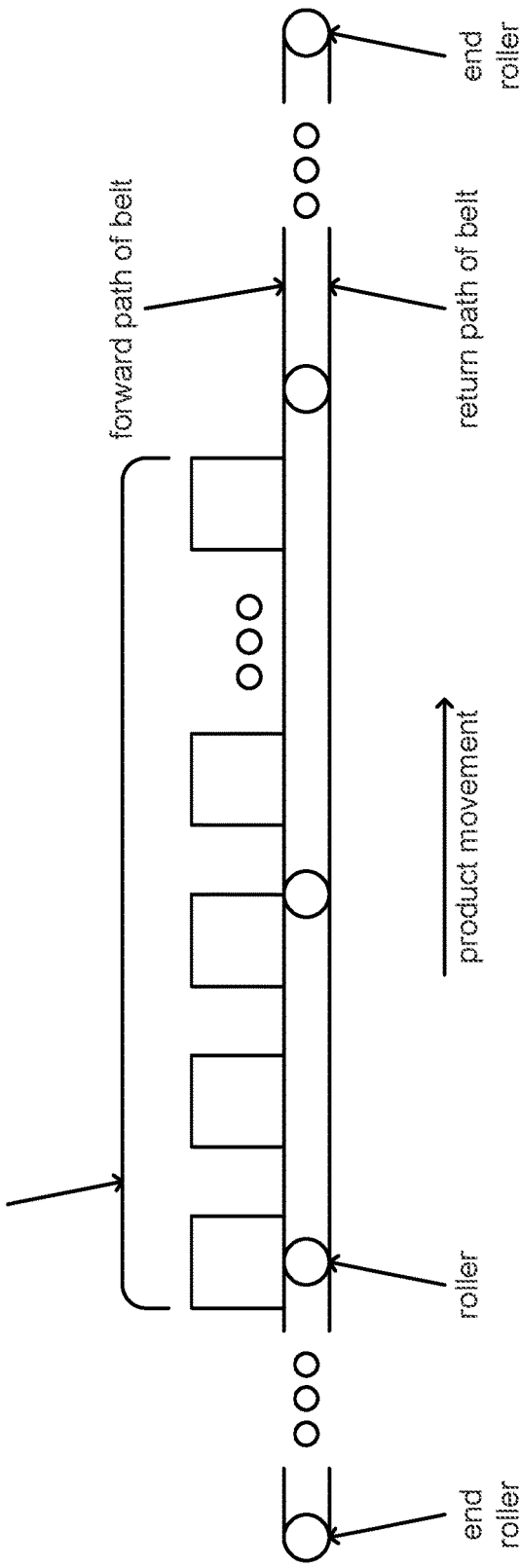
FIG. 1 illustrates an embodiment of a conveyor belt system.

Generally speaking, a novel design and architecture is presented herein by which a conveyor system may be implemented by employing a direct drive engagement of the conveyor belt through the use of an accompanying block chain. Such a block chain may be constructed of any of a number of selected materials, and is particularly constructed in accordance with a polyethylene type material such as ultrahigh molecular weight (UHMW) plastic in one embodiment. Alternatively, such a block can be reconstructed in accordance with a nonporous plastic, such as a food grade nonporous plastic when such a conveyor system is implemented in accordance with food processing and/or food production applications. Also, as will be understood with respect to various embodiments and/or diagrams herein, such a block chain as employed herein can be cleaned along with the primary conveyor belt within the length of the return portion of the belt path. This allows for the ability to effectuate such cleaning and maintenance without completely shutting down the system.

Such a novel design and architecture operates by applying little or no tension to the conveyor belt itself. That is to say, the conveyor belt is driven through direct engagement by an accompanying block chain as opposed to through frictional engagement of the conveyor belt itself with the drum bars themselves. The unique block chain drive system within such a zero tension conveyor system, in accordance with various aspects, and their equivalents, of the invention, reduces the tension within the conveyor belt to be substantially or approximately near zero by directly affixing the conveyor belt to a drum assembly via a number of block chain links. By substantially reducing or eliminating any tension within the conveyor belt, the lifetime of a conveyor belt implemented within such a zero tension conveyor system may be increased significantly. That is to say, such a block chain drive system within such a zero tension conveyor system eliminates one of the sources of conveyor belt wear that can occur on the edge of the conveyor belt within those systems operating in accordance with frictional engagement between a conveyor belt and the drum bars. Oftentimes, when a conveyor belt needs to be replaced, it is because of deleterious wear in several locations on the conveyor belt (e.g., such as at the outer links or outer edge of the conveyor belt such as from running against stainless steel bars where caps, such as protective plastic caps, strips, and other materials, are missing or degraded, sometimes significantly, due to wear and tear, etc.).

Such a block chain drive system in accordance with various aspects, and their equivalents, of the invention can also provide for a significant improvement in overall cleanliness, sanitation, etc. for those conveyor systems implemented in accordance with food processing and/or food production applications. Because of such improvements, there is significantly reduced downtime required for maintaining, cleaning, etc. a conveyor system as described herein.

As may also be understood in accordance with the various embodiments and/or diagrams herein, a zero tension system conveyor implemented in accordance with various aspects, and their equivalents, of the invention may be implemented in a very low profile design having a very small footprint while obviating the need for extremely frequent maintenance and while obviating many of the sanitation issues associated with other types of conveyor systems. Also, the use of such a block chain drive system allows for a relatively small conveyor belt radius thereby allowing for a relatively small footprint. In addition, the use of such a block chain drive system allows for direct engagement with a drum assembly (e.g., such as by using drum bars associated therewith) thereby forming a direct drive from the drum assembly to the conveyor belt. Such drum bars may be constructed of any of a number of selected materials, and is particularly constructed in accordance with stainless steel in one embodiment.

This direct engagement of the drum assembly to the conveyor belt substantially reduces or eliminates any tension that is required against the drum assembly to drive the conveyor belt (e.g., the driving of the conveyor belt is effectuated via direct engagement of the block chain to drum bars of the drum assembly as opposed to the conveyor belt being driven in accordance with a frictional engagement). As may be understood, the substantial reduction or elimination of friction being required to drive the conveyor belt allows for a significant reduction in the horsepower required to drive the overall conveyor belt system. For example, the electricity, energy, horsepower, required to sustain motion of the conveyor belt in accordance with a substantially reduced or eliminated tension conveyor belt system as described herein is greatly reduced through direct drive. For example, as will be seen in accordance with the direct mechanical engagement between respective links of a block chain with drum bars of a drum assembly, there is no inherent energy loss such as that which may be associated with a slipping friction drive in other systems. A lower horsepower motor with an associated smaller transmission may be used in driving the drum assembly of such a conveyor belt system as described herein. Moreover, additional power consumption savings may be achieved from the unrestricted airflow options that can be used to optimize or maximize the respective energy exchange rates within the system. For example, as an effective heat transfer rate is improved through more efficient airflow, additional operational process savings may be achieved.

FIG. 1 illustrates an embodiment 100 of a conveyor belt system. As described elsewhere herein, a conveyor belt system may be employed for any of a number of purposes in any of a number of applications. For example, such a conveyor belt system may be employed for moving various products from one point to another. Such movement may be associated with manufacturing of one or more articles or components, production of one or more articles or components (including food products), etc. For example, with reference to food processing and/or food production, such a conveyor belt system may be utilized in applications associated with freezers, proofers, ambient, drying, airflow, and cooking applications. As will be understood in accordance with the various diagrams and/or embodiments herein, with respect to airflow applications, given the open drum construction and open conveyor belt design, such as in accordance with (though not limited to) spiral conveyor systems, provided herein in accordance with a substantially tension reduced or tension eliminated conveyor belt system, any of a number of airflow implementations may be effectuated including vertical and/or horizontal airflow across product being conveyed on the conveyor belt, including, vertical up, vertical down, dual air vertical, dual impingement, horizontal, dual horizontal, high/low horizontal, etc.

The embodiment 100 shows very generally how a conveyor belt system may be viewed as including an endless conveyor belt, such that the respective ends of the conveyor belt are connected thereby forming a continuous and endless loop. The conveyor belt may pass by and around a number of rollers, including end rollers, before repeating its respective path. As may be understood, depending upon the direction of movement of the conveyor belt, a forward pass of the belt and a return path of the belt will be oppositely situated with respect to each other. It is also noted that such conveyor belt systems may be implemented in any of a variety of configurations, including spiral implemented configurations such that certain portions of the conveyor belt pass extend helically around a drum assembly such that products may be conveyed up or down around that drum assembly.

However, it is noted that the various means by which a conveyor belt may be driven within such a conveyor belt system in accordance with using direct engagement by a block chain as described herein may be extended to any desired configuration of conveyor belt system (e.g., including those which are not helically based).

In addition, it is noted that while certain embodiments envision moving product along the path of the conveyor belt in only one direction, alternative embodiments may include the capability to drive the conveyor belt in more than one direction. For example, considering a conveyor belt as an accumulating conveyor, such a conveyor belt may be operative to convey a product in one direction during a first time or time period, and operative to convey that same product, or other product, in another direction during a second time or time period. Certain embodiments may include a forward and reverse direction for conveying product along the path of the conveyor belt. In addition, it is noted that multiple respective conveyor systems may interact cooperatively such that more than a singular pathway exists, and certain portions of conveyors may be operative in forward and backward directions, while other portions of conveyors may be operative in only one of the forward or backward directions, etc. Generally speaking, any desired combination of various conveyors, in any desired configuration, may be implemented in accordance with any one or more of the various aspects, embodiments, and/or their equivalents, of the invention.

FIG. 2 illustrates an embodiment 200 of a conveyor belt system implemented with separate processing regions. This diagram shows how different respective portions of the conveyor belt may undergo different respective processing. For example, as may be understood in accordance with certain manufacturing processes, different operational steps may be performed on a given article of manufacture at different times during the entire manufacturing process. With respect to food processing and production, different operational steps may be performed in accordance with generating an end food product. It is of course noted that a given product may undergo modification during one or more of the respective operational processes applied thereto, in that, a product may be firstly modified in accordance with the first processing region, secondly modified in accordance with the second processing region, etc. As may be understood, during such operations, the product being conveyed via the conveyor belt system may undergo modification and/or transformation during its respective passage through the conveyor belt system.

In accordance with performing different respective processing operations on respective products (e.g., whether they be articles of manufacture, food components, etc.), different environmental considerations and constraints may be particularly associated with each respective processing region. For example, any two respective processing regions may have as few as one or as many as all different respective characteristics, such as, temperature, humidity, moisture, airflow, pressure (e.g., such as environmental/air pressure within a given region), heating, cooling, drying, freezing, addition of one or more components, modification of size (e.g., such as cutting or reducing to a specified or desired size), packaging, etc. That is to say, each respective processing region may be particularly tailored to performing any one or more of the total operational steps employed in creating an end product. For example, within a food processing and production implementation, a first processing region may be associated with mixing a number of components together, while a second processing region may be associated with cooking the resultant of mixed components, while a third processing region may be associated with cooling the cooked resultant, while a fourth processing region may be associated with packaging the final resultant, etc. Generally, it may be understood that different respective processing regions may be specifically suited and tailored for performing different operations and the respective environmental considerations and constraints within those different respective regions may be varied.

Again, as also described with respect other embodiments, different respective directional movement of product along any one or more conveyors may be made, including both forward and backward movement of product at different respective times or time periods, such as in accordance with an accumulating conveyor.

Figure 3:
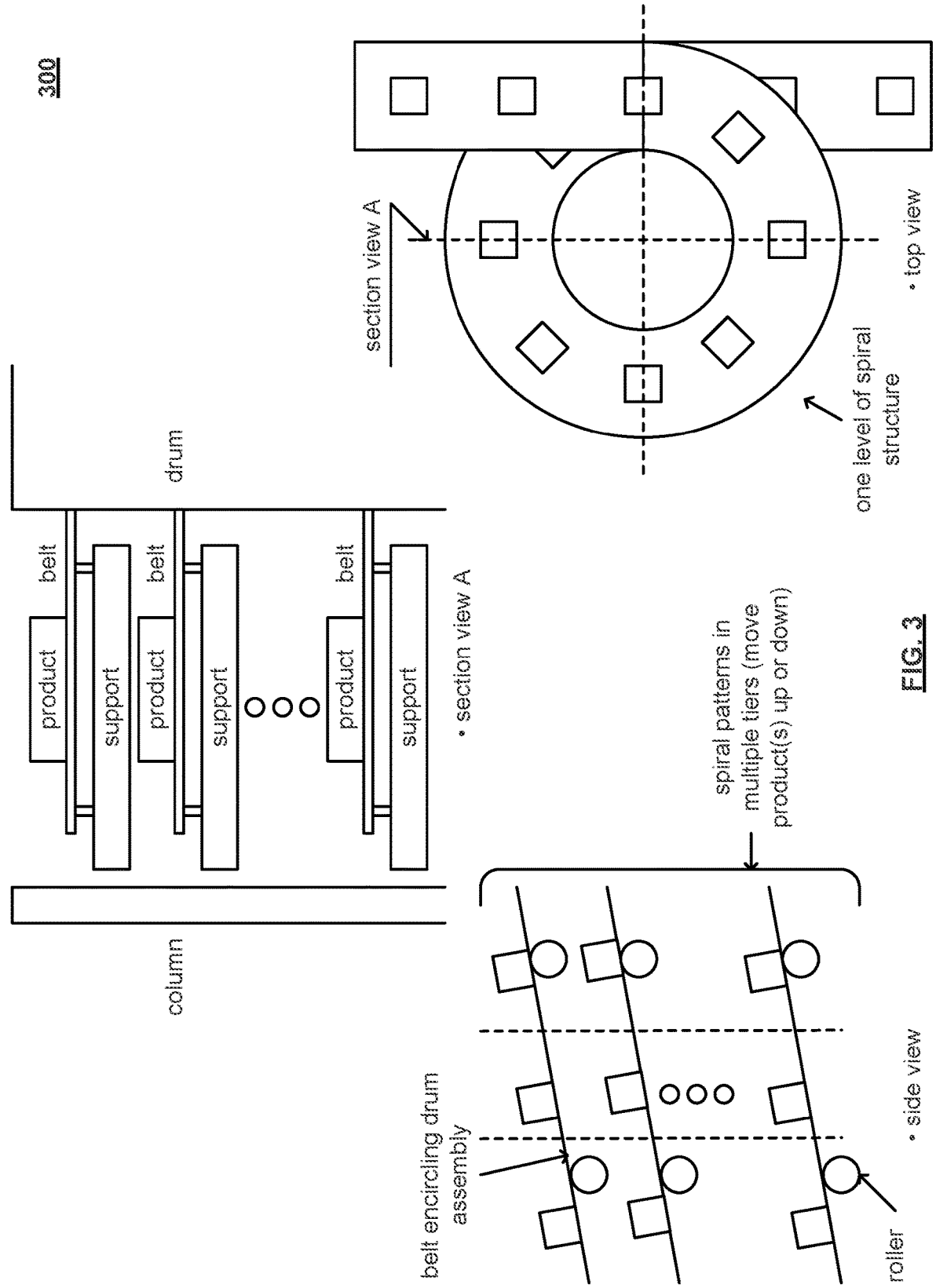
FIG. 3 illustrates an embodiment of a spiral conveyor belt system.

FIG. 3 illustrates an embodiment 300 of spiral conveyor belt system. As described elsewhere herein, various aspects, and their equivalents, of the invention may be generally applied to any desired conveyor belt system having any particular type of configuration or architecture, one particular embodiment is directed towards a spiral conveyor system in which a product moves helically around a drum assembly either upward or downward. For example, a conveyor belt is implemented such that the conveyor belt encircles a drum assembly in a spiral configuration such that respective products are conveyed either up or down by the conveyor belt. Operations performed on the products may be varied with respect to different respective tiers of the overall spiral structure encircling the drum assembly.

As can be seen in the left hand side of the diagram, the different respective tiers or levels of the spiral architectural portion of the conveyor belt system will generally have some tilt associated therewith as the conveyor belt helically winds around the drum assembly either upward or downward. As can be seen in the right-hand side of the diagram, considering one particular level of the spiral architecture, the conveyor belt may be viewed as subsuming or overriding itself from the top view perspective because of the helical passage of the conveyor belt upward or downward around the drum assembly.

Generally, the spiral conveyor system may be understood as moving product around such a drum assembly in a spiral configuration either to elevate or lower the product in accordance with each respective rotation around the drum assembly. The use of a vertical spiral pattern may allow for extending and controlling the length of time that a product is on the conveyor belt and held within the defined footprint. In accordance with certain food processing, production, and/or packaging applications, the use of a limited footprint allows for environmental control (e.g., by implementing the spiral architecture within an enclosed and environmentally controllable environment) to control any of a number of conditions including temperature, humidity, moisture, airflow, pressure, heating, cooling, drying, freezing, etc.

Figure 4:
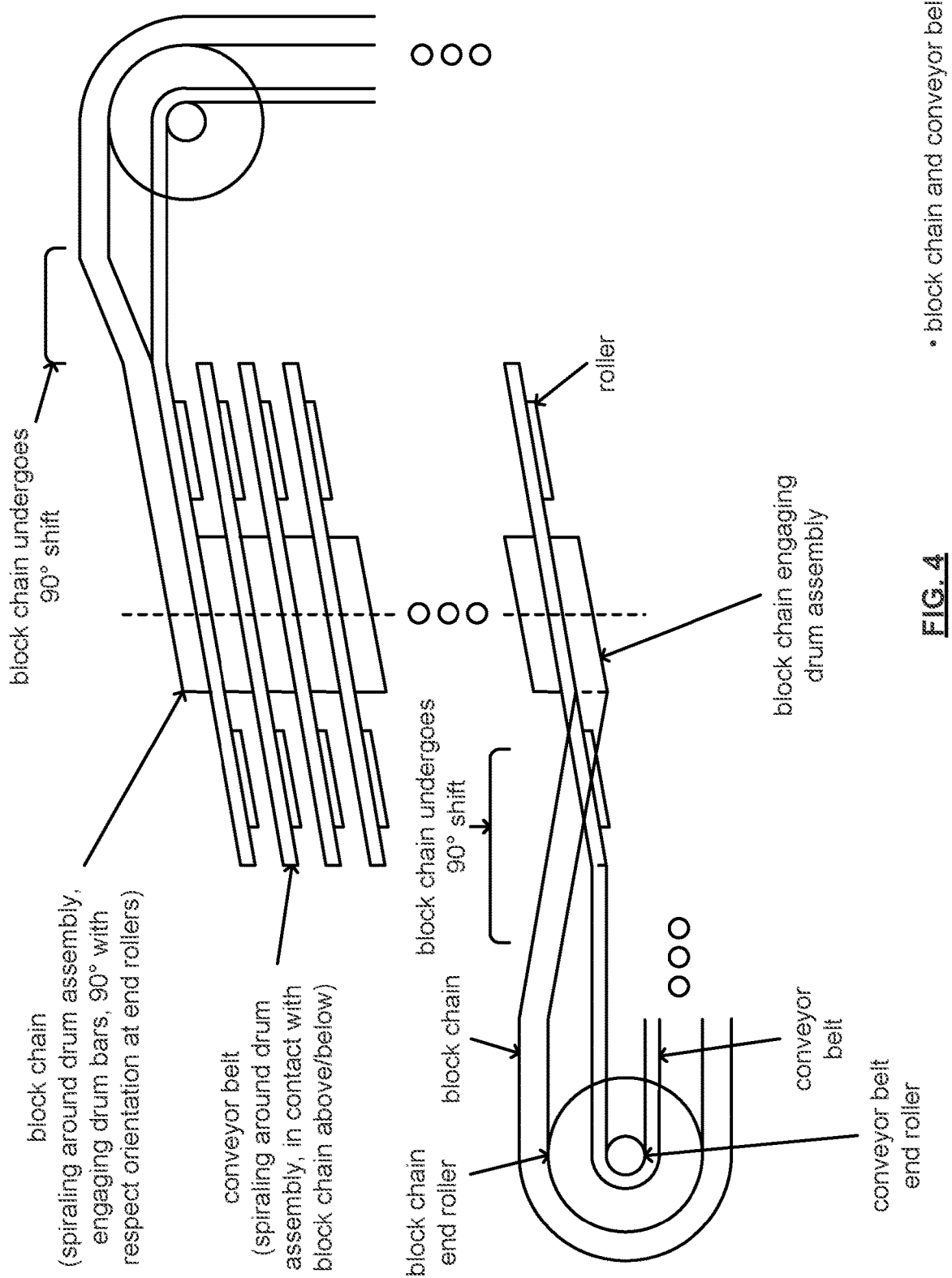
FIG. 4 illustrates an embodiment of a drum assembly and block chain.

FIG. 4 illustrates an embodiment 400 of a drum assembly and block chain. As can be seen with respect to this diagram, a conveyor belt passes around a drum assembly such that a block chain also passing around that drum assembly engages each respective helical pass of the conveyor belt above and below the conveyor belt in accordance with a clamping force between respective stacking points in a helical structure. For example, from certain perspectives, the conveyor belt and the block chain may be viewed as both spiraling around the drum assembly, yet the configuration of the block chain and the conveyor belt may be viewed as being 90° with respect to each other. That is to say, the block chain may be viewed as engaging a number of drum bars (e.g., which are pictorially illustrated with respect to other diagrams) on one side (e.g., on the backside of the block chain), while the block chain may also be viewed as engaging a portion of the conveyor belt above and below in accordance with a clamping force between respective stacking points in a helical structure. For example, as the conveyor belt spirals around the drum assembly in the helical fashion, the block chain, while being engaged and driven by the drum bars of the drum assembly, is in contact with the conveyor belt. As may be seen with the diagram, an alternating pattern may be viewed with respect to the block chain and the conveyor belt with respect to the various tiers of the helical structure associated with the drum assembly. For example, considering the block chain and conveyor belt as propagating upward through the helical structure, the alternating pattern between block chain and conveyor belt may be viewed as beginning with block chain, then conveyor belt, then block chain, and so on until at the top of the helical structure, the block chain is the final resulting element. Because of the inherent static force/weight of the conveyor belt, there is effectuated a clamping force between the respective stacking points of where the block chain meets with the conveyor belt within the helical structure.

That is to say, the inherent static force/weight of the conveyor belt, in conjunction with the layered and alternating implementation of the block chain/conveyor belt configuration around the drum assembly, the inherent and continuous contact between the block chain and even a very small portion of the conveyor belt sufficiently engages the conveyor belt (e.g., clamping force) in driving the conveyor belt through the entire spiral conveyor belt system.

As may be seen with respect to this diagram, both the block chain and the conveyor belt may also pass through any of a number of additional pathways within the overall system. If desired in some embodiments, both the block chain and the conveyor belt may take a relatively similar path throughout the overall system. However, in other embodiments, the block chain and the conveyor belt may take entirely different paths through the overall system outside of the drum assembly portion thereof. That is to say, the interaction between the block chain and the conveyor belt within the helical structure associated with the drum assembly may be viewed as that component which effectuates the driving of the conveyor belt through the entire spiral conveyor belt system, and it is not necessary that the block chain follows a similar path through the entire spiral conveyor belt system as made by the conveyor belt itself.

Within this diagram, it may be seen that a conveyor belt end roller and a block chain end roller are axially aligned with one another (e.g., which may be viewed as designer choice), but alternative embodiments need not necessarily have such a feature. For example, in such an embodiment such that the block chain and the conveyor belt share at least one axially aligned end roller, roller, component, etc., this may require that the block chain undergo a 90° orientation shift when transitioning from the drum assembly portion of the overall spiral conveyor belt system to other portions thereof. That is to say, considering the block chain as having a first dimension being relatively wider than another dimension (e.g., being X"×Y" respectively in dimension, such that X is larger than Y, without considering the overall length of the block chain), then the relatively wider dimension may be selected for engaging the drum bars of the drum assembly on one side of the block chain.

Figure 5:
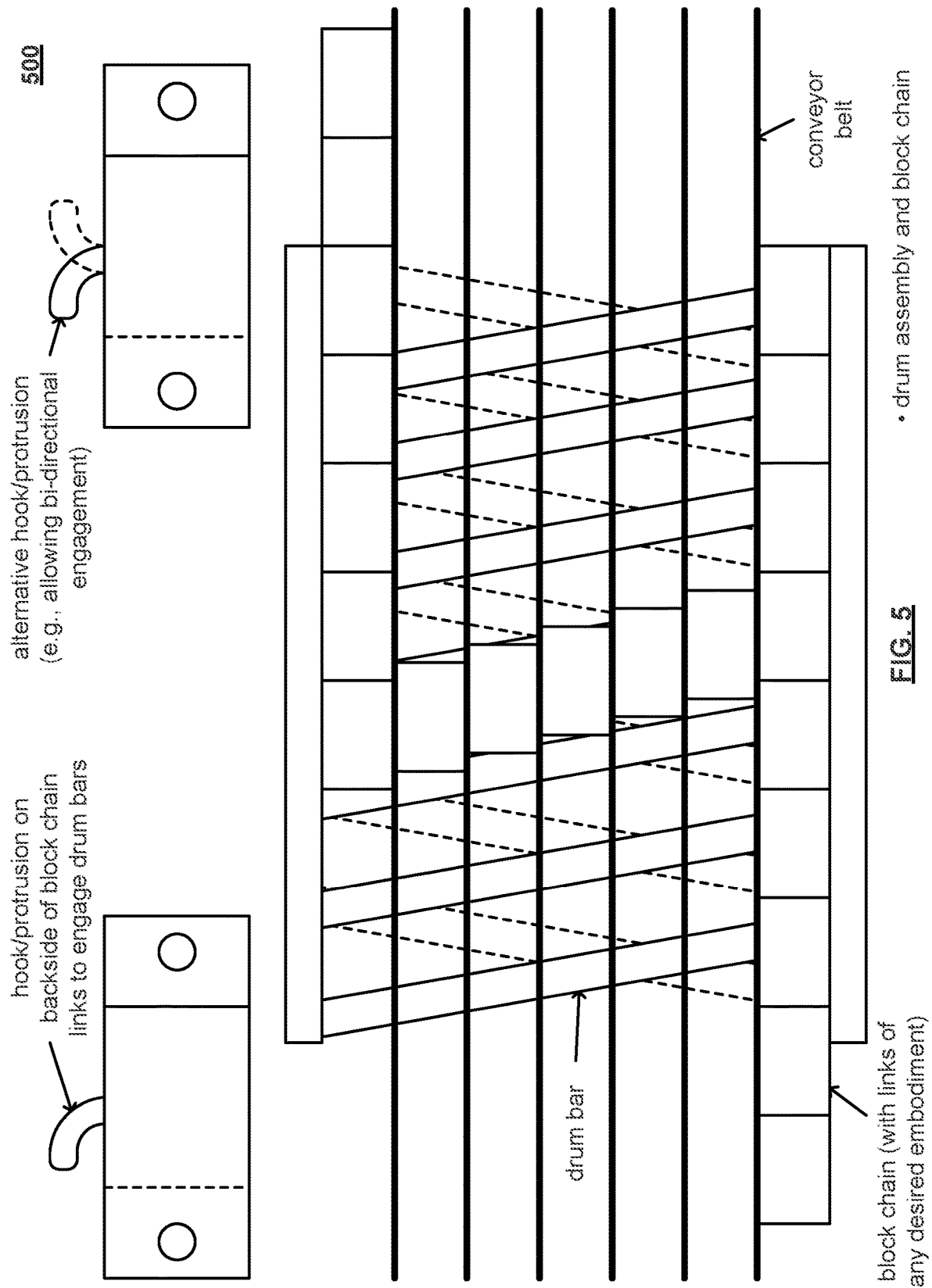
FIG. 5 illustrates an embodiment of a spiral conveyor belt system including a drum assembly and block chain.

FIG. 5 illustrates an embodiment 500 of a spiral conveyor belt system including a drum assembly and block chain. This diagram pictorially illustrates the respective drum bars of the drum assembly as directly engaging at least some of the respective links of the block chain. Also, for ease of illustration for the reader, the respective tiers of the helical pathway encompassing the drum assembly are shown as being generally level with respect to the reference of the diagram, though the reader will of course understand that in an actual helical architecture, the respective tiers of the conveyor belt and block chain will be actually rising or falling in elevation as they propagate around the drum assembly. Also, each respective link of the block chain is not pictorially illustrated within each respective tier within the drum assembly portion for ease of illustration for the reader (e.g., to allow for illustration of the drum bars within the drum assembly).

At the top left portion of the diagram, a feature associated with at least some of the respective links of the block chain corresponds to a hook or protrusion on the backside thereof for directly engaging the drum bars which extend generally vertically within the drum assembly (e.g., for locking onto the drum bars to assist in driving the block chain in at least one given direction). As also understood with respect to other embodiments, at least one embodiment may include one or more hooks or protrusions on one or more of the links or segments of the block chain to assist in directly engaging with the drum bars of the drum assembly to assist driving the block chain in one or more directions (e.g., such that a given conveyor belt may be driven at least forward and backward). Also, it is noted that each and every block chain link or segment need not necessarily include a corresponding hook or protrusion thereon. At least one embodiment may include a corresponding hook or protrusion on each respective block chain link or segment. At least one additional embodiment may include a corresponding hook or protrusion on fewer than each respective block chain link or segment (e.g., generally less than all, every other block chain link or segment, every Nth block chain link or segment [where N is any desired integer], or using some other pattern such as a non-uniform and/or non-repeating pattern, etc.).

As can be seen within this diagram as well, the respective drum bars may generally have a backwards leaning slope to assist in effectuating the helical and spiral propagation of the block chain and conveyor belt through the drum assembly portion of the overall spiral conveyor belt system. For example, rather than having a 90° vertical attachment, the respective drum bars have this backwards leaning slope to assist in lifting the block chain with each respective revolution of the drum assembly. The respective links of the block chain, as being in mechanical engagement using the respective hooks/protrusions on the backside thereof, glide upwards on the drum bars to form the next tier level within the spiral architecture. The drum bars may be particularly designed with a selected backwards tilt angle such as to allow the respective links of the block chain to release their grip and move or slide upwards or downwards with a relatively minimal sliding friction.

As referenced elsewhere herein, multiple respective stacking points may be viewed as existing through the alternating and stacked structure of the block chain and the conveyor belt. For example, the block chain, which may be implemented in accordance with any of a number of respective embodiments, several of which are described elsewhere herein, helically encompasses the drum assembly such that a portion of the conveyor belt is in contact with the block chain within the drum assembly. For example, it is noted that only a relatively small portion of the conveyor belt need be in contact with the block chain. For example, considering a conveyor belt having a width of Z", then only a relatively small percentage of that width (e.g., 5%, 10%, etc.) need be in contact with the block chain within the drum assembly portion of the overall spiral conveyor belt system. It is also noted that the relatively inner portion of the conveyor belt, namely, that portion which is relatively closer to the drum assembly, is that portion of the conveyor belt which is in contact with the block chain. The remainder of the conveyor belt (e.g., the entire remainder of the conveyor belt except for that relatively small percentage thereof that comes into contact with the block chain) may be supported in any of a number of ways including using one or more rollers, one or more static supports such as a fixed helix rail [e.g., outer belt support] attached to the support structure surrounding the conveyor belt path, etc. For example, as may be understood with respect to this embodiment and/or other diagrams and/or embodiments herein, only the inner edge of the conveyor belt is engaged (e.g., clamping force between respective stacking points in a helical structure) with the block chain within the spiral architecture. The spiral conveyor column assembly forms an overarching support structure around the outside of the drum assembly and the respective conveyor belt tiers (e.g., a helical stacked structure). This support structure secures the top center bearing hub of the drum shaft and each respective leg thereof may be implemented to provide multiple supports for the outer edge of the conveyor belt at each respective tier level therein.

A number of observations may be made with respect to the implementation of directly engaging the conveyor belt by use of a block chain grabbing the conveyor belt on both its respective top and bottom surfaces. For example, because the static force/weight of the belt is in continuous contact with the block chain throughout the drum assembly portion of the overall spiral conveyor belt system, there is little to no tension or stress incurred by the conveyor belt. From certain perspectives, the interaction between the block chain and the conveyor belt may be viewed as being a very distributed interaction continuously throughout the drum assembly such that there are little or no outline stress points as may be applied to the conveyor belt. Because the conveyor belt is in continual contact with the block chain throughout the drum assembly, there will be very little if any stress applied to the conveyor belt which may potentially degrade the quality of the conveyor belt itself. As such, because there is little if any stress applied to the conveyor belt, the relative lifetime of the conveyor belt implemented within such a zero tension system conveyor, such as within a spiral configuration as described with reference herein, may be extended significantly in comparison to prior art conveyor systems which drive the conveyor belt via frictional engagement. Again, as may be understood with reference to FIG. 5, the conveyor belt and the block chain are in continuous contact through the entirety of the drum assembly portion of the overall spiral conveyor belt system. As such, there are no localized and highly stressful contact points between the conveyor belt and the block chain.

With respect to the design of the drum employed within such a drum assembly, a drum may be employed that rotates about its axis (e.g., extending vertically through the center of the drum assembly). As may be understood with respect to the substantially reduced or zero tension operation as provided in accordance with various aspects, and their equivalents, of the invention, a substantially reduced drive motor may be employed in driving the drum assembly including the respective drum bars providing direct engagement to the block chain. Moreover, the respective drum bars are operative to engage the block chain with direct mechanical force which in turn directly engages the inner edge of the conveyor belt. Rotation of the conveyor belt is not dependent on a precise amount of friction with the drum assembly. Also, rather than employing flat bars designed to distribute compression forces from the belt tension, the respective drum bars within the drum assembly herein are cylindrical. However, it is noted that alternatively shaped drum bars may be employed (e.g., square, rectangular, triangular, flat bar, etc.) without departing from the scope and spirit of the invention. Each respective drum bar may be secured in an extended position such that the leading edge thereof is obstructed by supports to allow the respective hooks/protrusions of the block chain to move axially against the drum as it ascends the length of a given drum bar.

Figure 6:
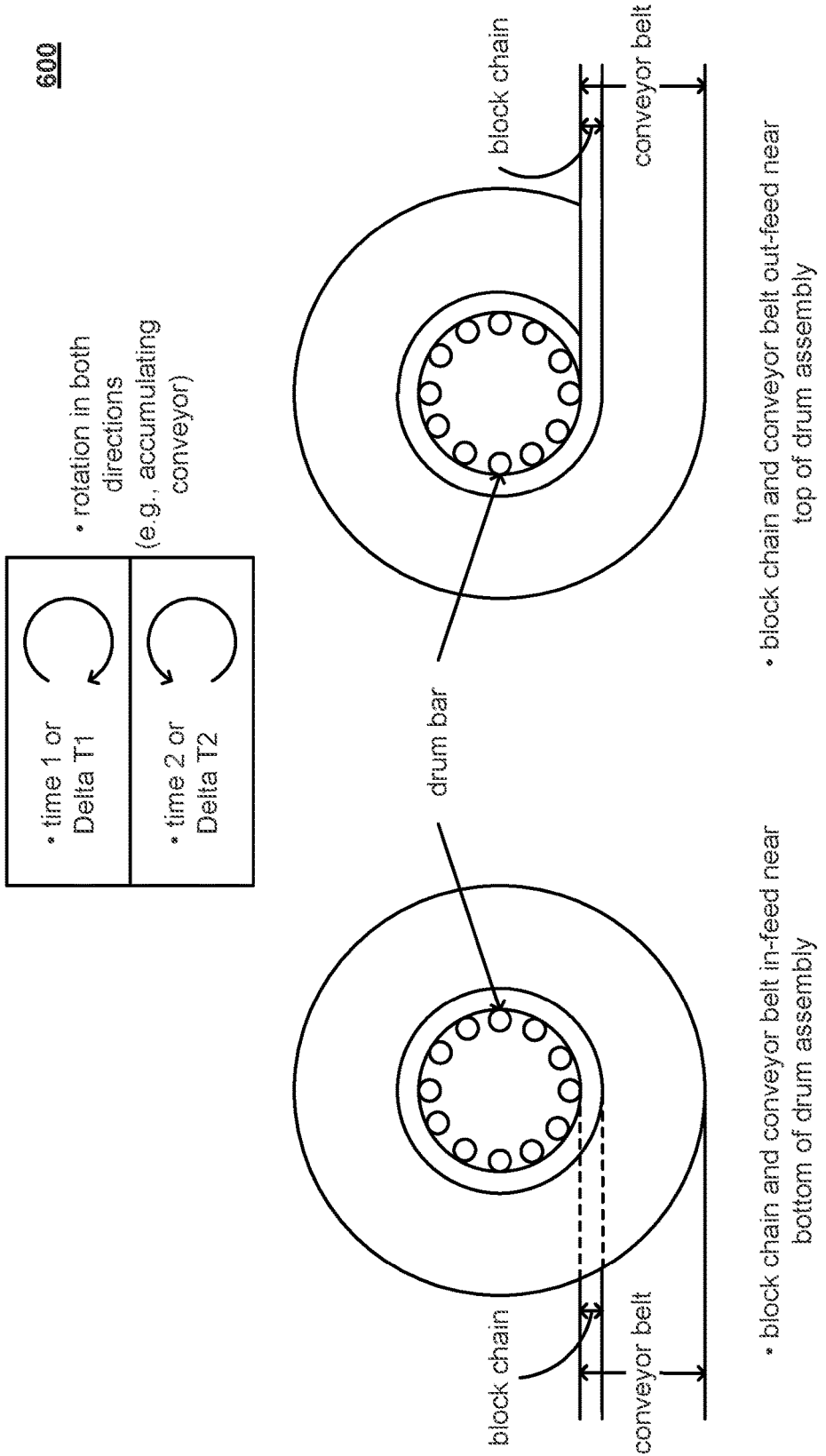
FIG. 6 illustrates an embodiment of block chain and conveyor belt in-feed and out-feed with reference to a drum assembly of a spiral conveyor belt system.

FIG. 6 illustrates an embodiment 600 of block chain and conveyor belt in-feed and out-feed with reference to a drum assembly of a spiral conveyor belt system. This diagram pictorially illustrates a block chain and conveyor belt entering into and exiting from a drum assembly. A block chain has a mechanical subassembly at the in-feed of the drum assembly to join the conveyor belt, and the discharge section of the spiral has a mechanical subassembly to divide the block chain and the conveyor belt. Again, by directly connecting the conveyor belt to the drum assembly using the block chain, the conveyor belt is driven with substantially reduced or zero tension thereby allowing for a greatly extended conveyor belt life (e.g., and also substantially extending the time periods between maintenance and replacement of the conveyor belt within such systems). This particular diagram shows the block chain and conveyor belt entering near the bottom of the drum assembly and exiting near the top of the drum assembly, though it is noted that the converse may be desirable within certain embodiments (e.g., entering near the top of the drum assembly and exiting near the bottom of the drum assembly). Also, it is noted that while this particular diagram also shows a counter-clockwise drum rotation, the converse of a clockwise drum rotation may be desirable within other embodiments without departing from the scope and spirit of the invention.

As may be understood with respect to the helical and spiral architecture of the respective paths of the block chain and conveyor belt within the drum assembly portion, considering the implementation where the block chain and conveyor belt are entering near the bottom of the drum assembly and exiting near the top of the drum assembly, the conveyor belt and block chain may be viewed as coming into the drum assembly and then spiraling around in a helical fashion towards the top of the drum assembly, and then exiting from the drum assembly upon reaching the top thereof.

As may be seen with respect to this diagram, there is a portion of overlap between the conveyor belt and the block chain. As the block chain is directly engaged with the respective drum bars of the drum assembly, the block chain also overlaps with and is in continuous contact with the conveyor belt within the drum assembly portion. Moreover, as can be seen pictorially within this diagram, only a relatively small portion of the conveyor belt need be in contact with the block chain. The remaining portion of the conveyor belt may be supported in any particular desired way, including using one or more rollers, one or more static supports such as a fixed helix rail [e.g., outer belt support] attached to the support structure surrounding the conveyor belt path, etc. Also, while this diagram pictorially illustrates the conveyor belt extending completely across the entire width of the block chain in the overlap region, it is noted that certain embodiments may include one or more means by which the conveyor belt will be kept from coming into contact with the drum bars of the drum assembly.

In addition, within certain embodiments, a belt compression device may be implemented at the intake and/or outtake of the conveyor belt and/or block chain to/from the drum assembly. That is to say, such a belt compression device may be implemented to adjust the particular tension of the conveyor belt and/or block chain as they engage with the drum assembly. For example, by providing for a means by which the tension of the conveyor belt and/or block chain may be adjusted (e.g., adaptively increased or decreased), deleterious effects such as an inchworm effect of the conveyor belt may be avoided. Moreover, the use of such a belt compression device may provide a means by which a substantially or approximately same tension level is made at both the inner edge of the conveyor belt being in mechanical engagement with the block chain as well as the outer edge of the conveyor belt which may be supported using one or more rollers, one or more static supports such as a fixed helix rail (e.g., outer belt support) attached to the support structure surrounding the conveyor belt path, etc. Generally speaking, such a belt compression device may be implemented to ensure that the outer edge of the conveyor belt may be relatively expanded while the inner edge of the conveyor belt may be relatively collapsed. The use of such a belt compression device implemented at the intake and/or outtake of the conveyor belt and/or block chain to/from the drum assembly may assist in the reduction of product jams within the overall conveyor belt system.

Again, as also described with respect other embodiments, different respective directional movement of product along any one or more conveyors may be made, including both forward and backward movement of product at different respective times or time periods, such as in accordance with an accumulating conveyor. For example, considering the clockwise and counterclockwise rotation by which the drum assembly may rotate, movement of the conveyor in more than one direction may be achieved. Referring again to at least FIG. 5, it is noted that an appropriately designed hook or protrusion made be employed to allow for mechanical engagement with the drum bars regardless of which particular direction the drum assembly is being rotated or driven. For example, certain embodiments may include more than one respective hook or protrusion per block chain segment to effectuate being driven in more than one direction, while other embodiments may include a singular hook or protrusion per block chain segment such that that singular hook or protrusion on a given block chain segment allows for the drum assembly to be driven in more than one direction.

FIG. 7, FIG. 8, FIG. 9, FIG. 10, and FIG. 11 illustrate various embodiments A, B, C, D, and E (700, 800, 900, 1000, and 1100, respectively), of a block chain and connected links thereof.

As described elsewhere herein, a conveyor belt, which may be viewed as being continuous or endless in design, passes through a conveyor belt system through direct engagement as provided by a block chain. That is to say, instead of being driven through frictional engagement of the drum bars with one or more drive rollers being in direct contact with a conveyor belt, a block chain is implemented as to engage directly the conveyor belt. For example, in one preferred embodiment related to a spiral conveyor system, a rotating drum assembly includes a number of drum bars for exerting energy to respective links within a block chain to effectuate the driving and movement of the conveyor belt. As will be seen with respect to other embodiments and/or diagrams herein as well, only a relatively small portion of the conveyor belt comes into physical contact with the block chain, in that, a clamping force between respective stacking points of a spiral conveyor system (e.g. particularly around a drum assembly) serve as the mechanism for clamping onto the conveyor belt, such that there is very little, if any, friction required to propel and move the conveyor belt through the spiral conveyor system. By using such a configuration as described herein, the static force/weight of the conveyor belt being in respective contact between the various stacking points of the spiral conveyor system is sufficient and adequate to effectuate direct engagement of the conveyor belt. Moreover, it is noted that any of a variety of types of block chains, having different respective types of chain links, may be employed within such a spiral conveyor system.

Figure 7:
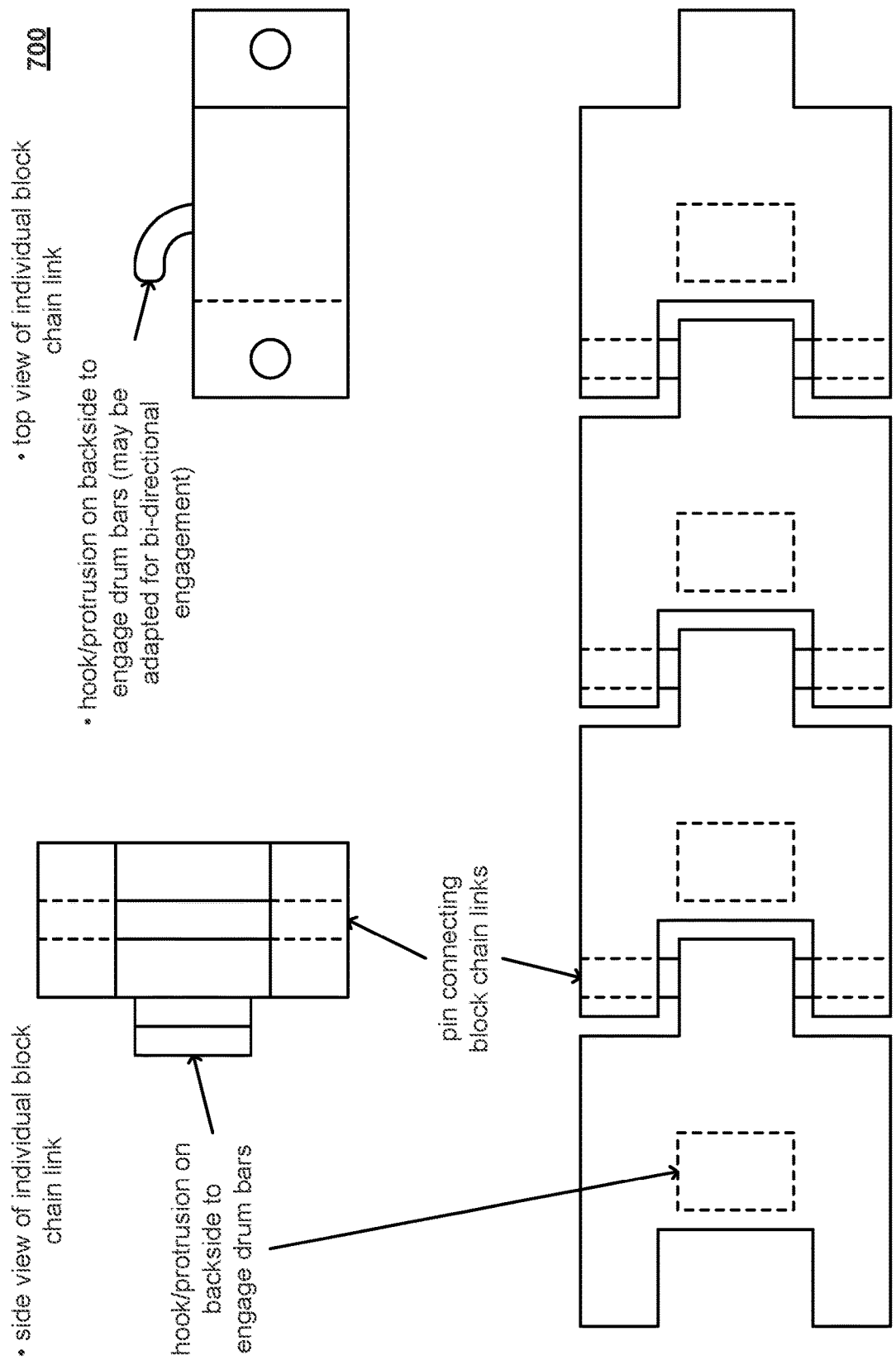
FIG. 7, FIG. 8, FIG. 9, FIG. 10, and FIG. 11 illustrate various embodiments A, B, C, D, and E, respectively, of a block chain and connected links thereof.

Referring to the embodiment A, shown by reference numeral 700 of FIG. 7, a number of respective links of a block chain are connected together. Each respective length of the block chain may be connected using pins (e.g., constructed with stainless steel) such that each respective pin can extend through at least one portion of a first link and at least one portion of a second link. On one side of the block chain, at least some of the respective links include a hook/protrusion for engaging the drum bars on a drum assembly (e.g., such as may be implemented within the spiral conveyor system). In certain embodiments, each respective link of the block chain includes a respective hook/protrusion for engaging drum bars; in other embodiments, one or more links need not necessarily include a hook/protrusion thereon, so long as an acceptable number of links within the block chain do in fact include such hooks/protrusions for effectuating direct engagement with the drum bars.

As the block chain comes into contact with the drum bars of the drum assembly, the respective hooks/protrusions on the backside of at least some of the links of the block chain are directly engaged. As may also be understood with respect to other diagrams and/or embodiments herein, the block chain is in continuous contact with at least a portion of the conveyor belt throughout the drum assembly portion of the overall spiral conveyor system.

With respect to this particular embodiment of a block chain and the respective links thereof, a respective link of the block chain may be viewed as having four respective protrusions (e.g., three of which are associated with intercoupling or interconnecting the respective links of the block chain through the use of pins, and one of which includes a hook/protrusion for directly engaging drum bars of the drum assembly).

Within this embodiment as well as others corresponding to a block chain, it is noted that the respective holes through the center or middle hinge tab of a given length of the block chain may be constructed as having dual tapered sides thereby allowing consecutive links of the block chain to twist slightly in addition to rotate around the hinge pin. Within a limited length of the block chain, sufficient cumulative twisting may be effectuated to allow the conveyor motion of the block chain to move over rollers placed at opposing 90° angles. In one embodiment, a multidirectional tapered hole in the center tab may be employed such that the span of consecutive links of the block chain can twist to follow any desired route through the overall conveyor system.

Also, in addition to the respective hole through the middle hinge tab of a given link the block chain having all sides tapered outwards from the center, the hole may be elongated. Such an elongated hole that provides a slot for the hinge pin to slightly move fore and aft such that a limited capture length of the block chain can be compressed. In turn, this linear compression will allow for the prescribed cumulative length of the block chain to be shortened sufficiently to push the respective hooks/protrusions on the backside of at least some of the links of the block chain in front of the respective drum bars. Relaxing the compression may then engage the hook/protrusion around the drum bar thereby effectuating the direct drive.

As may also be understood with reference to FIG. 5, among others, a number of respective edge blocks (e.g., such as associated with the respective wraps of the block chain around the drum assembly) may be referred to as stacking blocks. As the block chain wraps around the drum assembly a subsequent row of blocks is aligned on top of the conveyor belt which begins the alternating stack. This alternating stacking process occurs with each respective revolution around the drum assembly continues from the base of the drum cylinder vertically until it reaches the top of the drum bar (or in an alternative embodiment, starting from the top, continues from the top of the drum cylinder downward vertically until it reaches the bottom of the number). The overall height of these respective edge blocks determines the respective tier height spacing within the spiral assembly.

Figure 8:
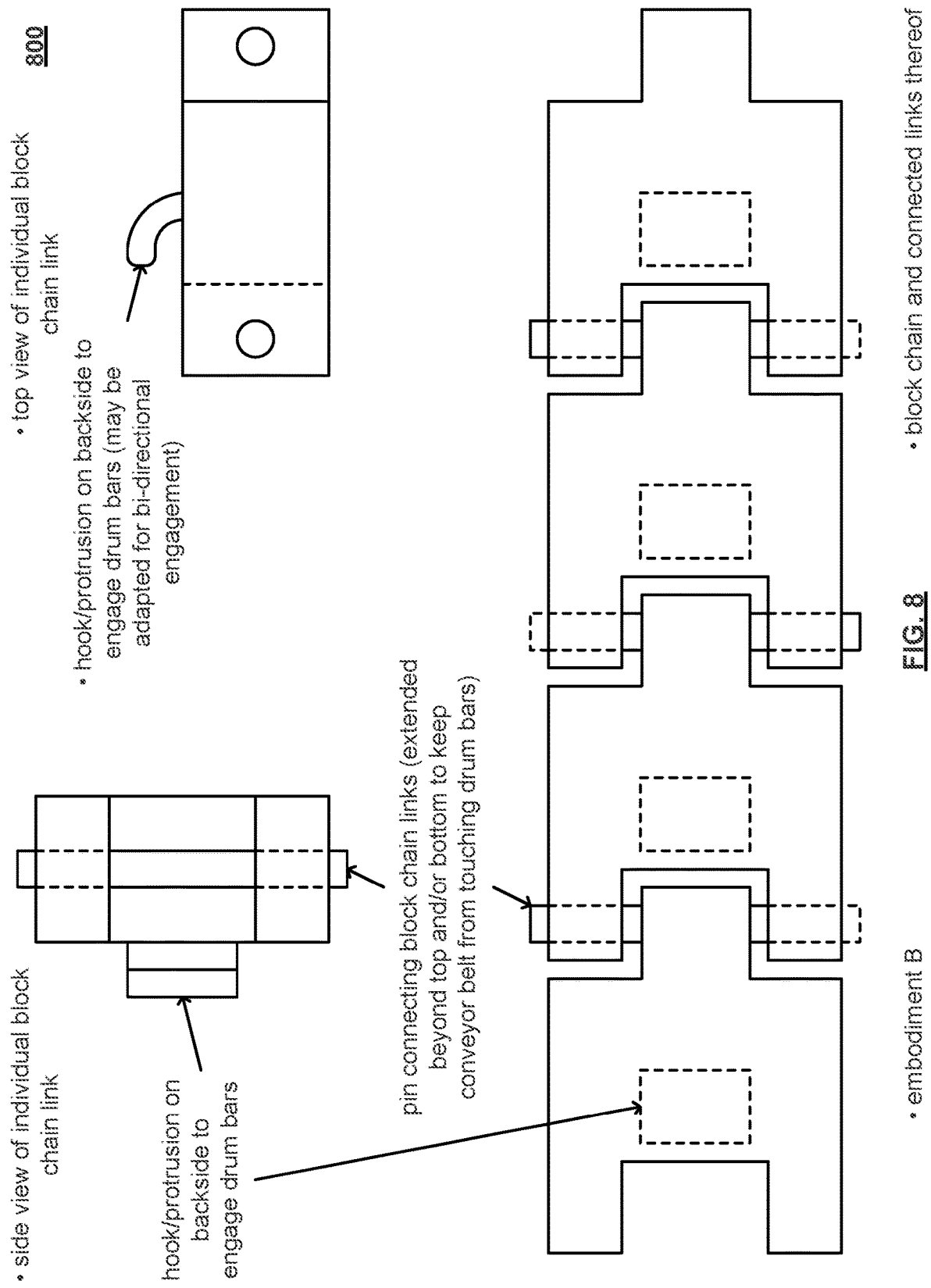

Referring to the embodiment B, shown by reference numeral 800 of FIG. 8, this embodiment B has some similarities to the previous embodiment A, with at least one difference being that the pins that are employed for inter-coupling or interconnecting the respective links of the block chain and/or downward extend to provide a means by which the conveyor belt will be kept from touching the drum bars. For example, these extended pins may serve as a means by which the conveyor belt will be kept from coming into contact with the drum bars as the block chain and the conveyor belt propagates through the drum assembly. As may be understood with respect to this embodiment as well as others, ensuring that the conveyor belt does not come into contact with the drum bars can substantially reduce or eliminate the possibility of transference of contamination from the drum bars to any product on the conveyor belt. If desired, the pins may be implemented in an alternating fashion such that the pin of one inter-coupling or interconnection between two respective links of the block chain extends upward, and the next pin of a next inter-coupling or interconnection between two respective links of the block chain extends downward, etc. in an alternating fashion. As such, the upward and/or downward extending pin portions will hopefully not come into contact with one another within the respective tiers of the drum assembly.

Figure 9:
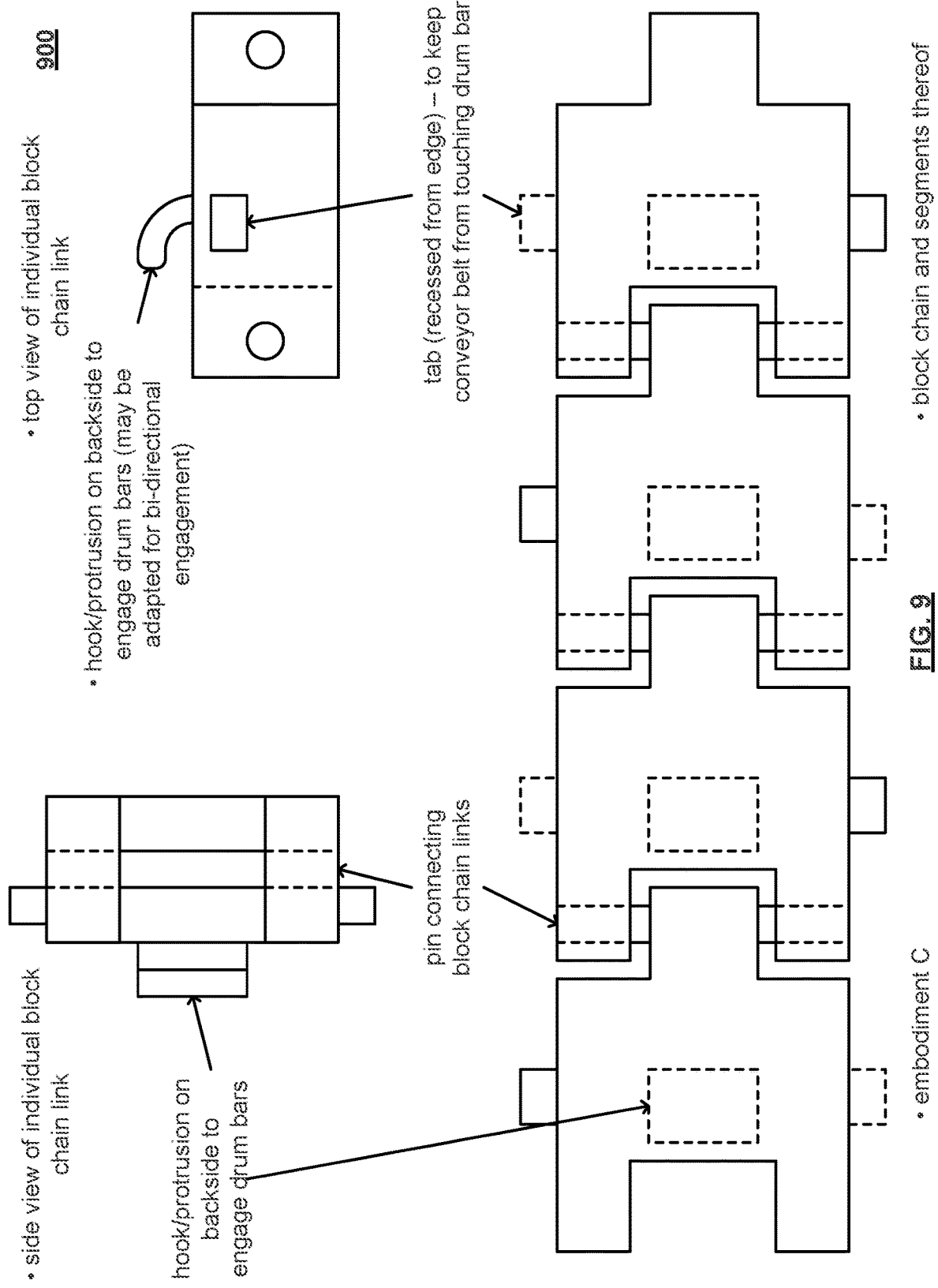

Referring to the embodiment C, shown by reference numeral 900 of FIG. 9, this embodiment C also has some similarities with the previous embodiment A, with at least one difference being that one or more tabs may be implemented on at least some of the respective links of the block chain. For example, such tabs, which may be viewed as being recessed from the edge of the top and/or bottom of a given link of the block chain, and implemented relatively closer to the hook/protrusion side of the block chain, may serve as a means by which the conveyor belt will be kept from coming into contact with the drum bars as the block chain and the conveyor belt propagate through the drum assembly. If desired in certain embodiments, tabs may be implemented within an alternating manner such that a respective tab occurs every other link of the block chain on the top side of the block chain and such that a tab occurs in an alternating manner every other link of the block chain on the bottom side of the block chain. For example, analogously as described above with respect to embodiment B, by alternating tabs extending upward and downward with respect to various links of the block chain, those tab portions will hopefully not come into contact with one another within the respective tiers of the drum assembly.

With respect to this particular embodiment of a block chain and the respective links thereof, a respective link of the block chain may be viewed as having five (if only one tab is included on a given block chain link) or six respective protrusions (if two tabs are included on a given block chain link).

Figure 10:
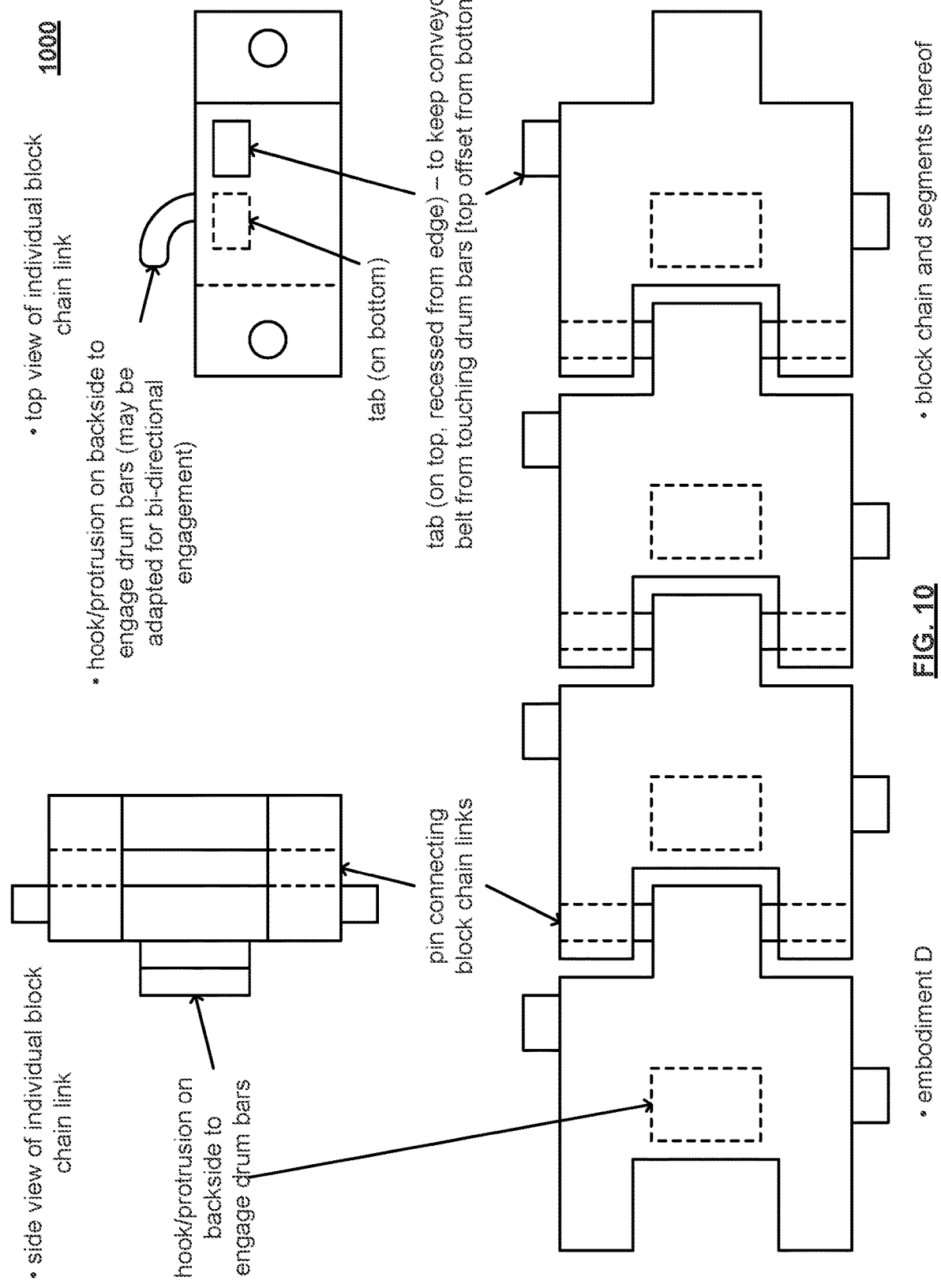

Referring to the embodiment D, shown by reference numeral 1000 of FIG. 10, this embodiment D also has some similarities with the previous embodiment C, with at least one difference being that respective tabs implemented on at least some of the respective links of the block chain are appropriately offset with respect to one another at the top and the bottom of a given length of the block chain. For example, such consideration may be viewed as ensuring that such tab portions will hopefully not come into contact with one another within the respective tiers of the drum assembly.

With respect to this particular embodiment of a block chain and the respective links thereof, a respective link of the block chain may be viewed as having six respective protrusions (two tabs are included on a given block chain link).

Figure 11:
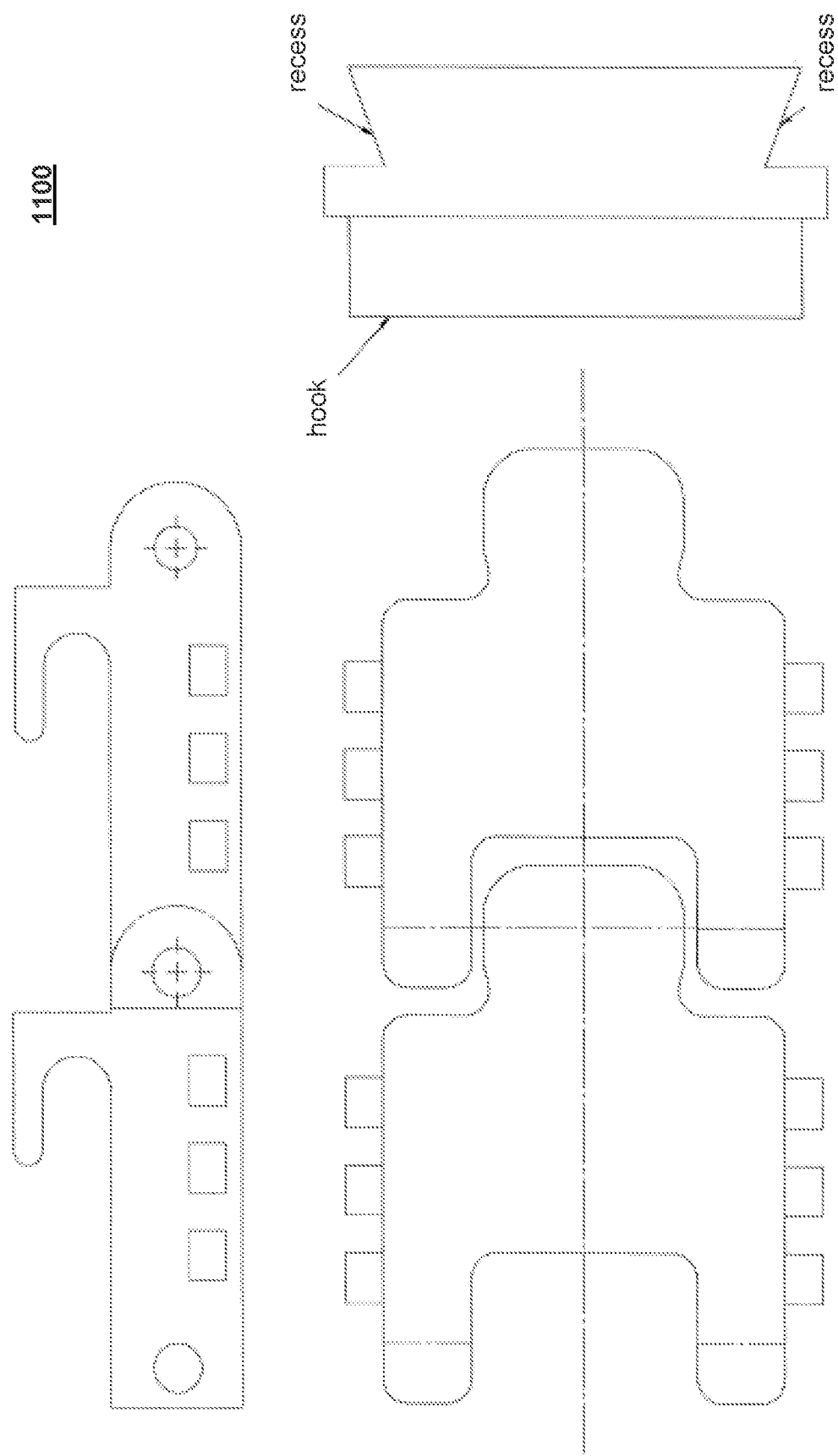

Referring to the embodiment E, shown by reference numeral 1100 of FIG. 11, this embodiment E includes individual block chain segments that have both a hook and a recess. When forming a helical stacked structure, such as around the drum assembly that includes a plurality of drum bars, the recesses of respective block chain segments will form an interface into which a lengthwise edge of the conveyor belt may couple. For example, considering a helical stacked structure formed by alternately and vertically stacked wraps of the block chain and the conveyor belt, the conveyor belt may be viewed as not only being held in compression between respective portions of the block chain in the helical stacked structure, but the conveyor belt may be viewed as also being held in mechanical engagement with a structure formed by the stacked segments of the block chain. As may be understood with respect to the recesses shown within this diagram, a dovetail shape or dovetail form type receiver will be created between respective stacked segments of the block chain. Of course, any desired shape or form of receiver may be employed in different embodiments.

Alternatively, as will be described with respect to other embodiments herein, instead of forming such a shape or form in between the respective stacked segments of the block chain, any individual block chain segments may include a shape or form to receive a lengthwise edge of the conveyor belt. In addition, it is also noted that a lengthwise edge of the conveyor belt may similarly be formed, fabricated, or constructed so that it interacts complementary with this shape or form of a receiver associated with the block chain, whether or not that receiver shape or form is formed by successively stacked portions of the block chain or within receiver shapes or forms included within respective block chain segments.

Generally speaking, a lengthwise edge of the conveyor belt may be viewed as having a form or shape that interacts complementary with a receiver shape or form associated with the block chain, again, whether or not that receiver shape or form is formed by successively stacked portions of the block chain or within receiver shapes or forms included within respective block chain segments. For example, such interaction may be viewed as a male and female interface, such that the lengthwise edge of the conveyor belt interfaces with such a shape or form associated with the block chain complementarily.

In addition, as may be understood with respect to this diagram, more than one respective tab may be included above and/or below respective block chain segments so as to prevent the conveyor belt from coming into physical contact with the drum bars of the drum assembly.

Figure 12:
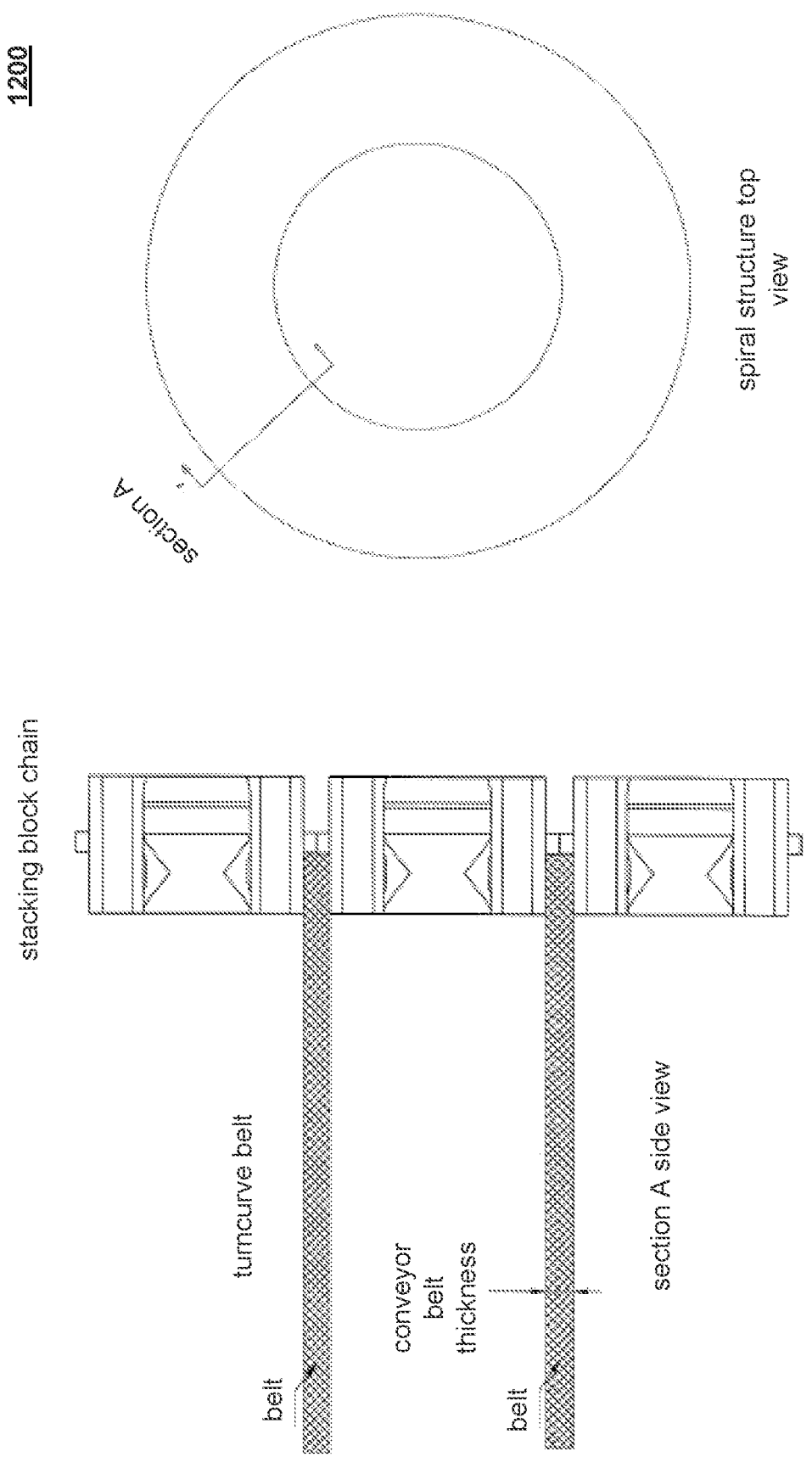
FIG. 12 illustrates an embodiment of compression engagement of a conveyor belt with stacked levels of a block chain.

FIG. 12 illustrates an embodiment 1200 of compression engagement of a conveyor belt with stacked levels of a block chain. As may be seen with respect to this diagram, a conveyor belt may be viewed as being held in compression between respective and successive portions of the block chain within a helical stacked structure, such as around a drum assembly. It is noted that the particular degree of compression provided by the interaction of the stacking block chain in the conveyor belt may be of any desired degree of compression. For example, such compression may be such as to prevent any slippage of the conveyor belt within the system, and particularly when interacting with the block chain in conjunction with the drum assembly. Alternatively, such compression may be to allow slippage of the conveyor belt, to any desired degree, when interacting with the block chain in conjunction with the drum assembly.

Also, it is noted that any desired thickness of conveyor belt may be employed (e.g., as pictorially illustrated in FIG. 12). For example, at least one embodiment includes a conveyor belt thickness of approximately 0.590 inches. However, it is noted that any desired conveyor belt thickness may be employed as desired in various embodiments.

FIG. 13 illustrates an embodiment 1300 of various conveyor belt options. As may be understood with respect to this diagram, any of a number of forms or shapes of a lengthwise edge of the conveyor belt may allow for mechanical interaction with a complementary form or shape formed either by successive portions of the block chain in the helical stacked structure (e.g., composed of alternatively and vertically stacked wraps of the block chain in the conveyor belt) or with a complementary form or shape included within respective block chain segments. It is noted that such embodiments that include a complementary form or shape included within respective block chain segments may include the receiver of a given shape or form anywhere along the vertical span of a given block chain segment or link.

For example, considering the implementation on the left hand side of the diagram, the lengthwise edge of the conveyor belt may be viewed as having a dovetail type shape, and a complementary dovetail receiver shape may be formed by the successive portions of the block chain of the helical stacked structure (e.g., composed of alternatively and vertically stacked wraps of the block chain in the conveyor belt).

Considering the implementation in the middle of the diagram, the lengthwise edge of the conveyor belt may be viewed as having a tab extending such that there are at least two respective portions of the edge of the conveyor belt that are held in compression between the successive portions of the block chain of the helical stacked structure. If desired, the degree of compression of both of these respective portions may be the same in certain embodiments, or they may be different.

Considering the implementation on the right hand side of the diagram, the lengthwise edge of the conveyor belt also may be viewed as having a tab extending outward; however, with respect to this particular implementation, the receiver shape or form is instead included within the respective chain link segments or links as opposed to being formed by the interaction of successive portions of the block chain of the helical stacked structure.

Again, it is noted that any desired one or more spacers, or other appropriately functional structures, may be included within one or more block chain segments so as to control or limit compression on the conveyor belt to any desired degree. For example, appropriately implemented compression may serve to allow or to prevent slippage of the conveyor belt when interacting with the block chain in conjunction with the drum assembly.

Figure 14:
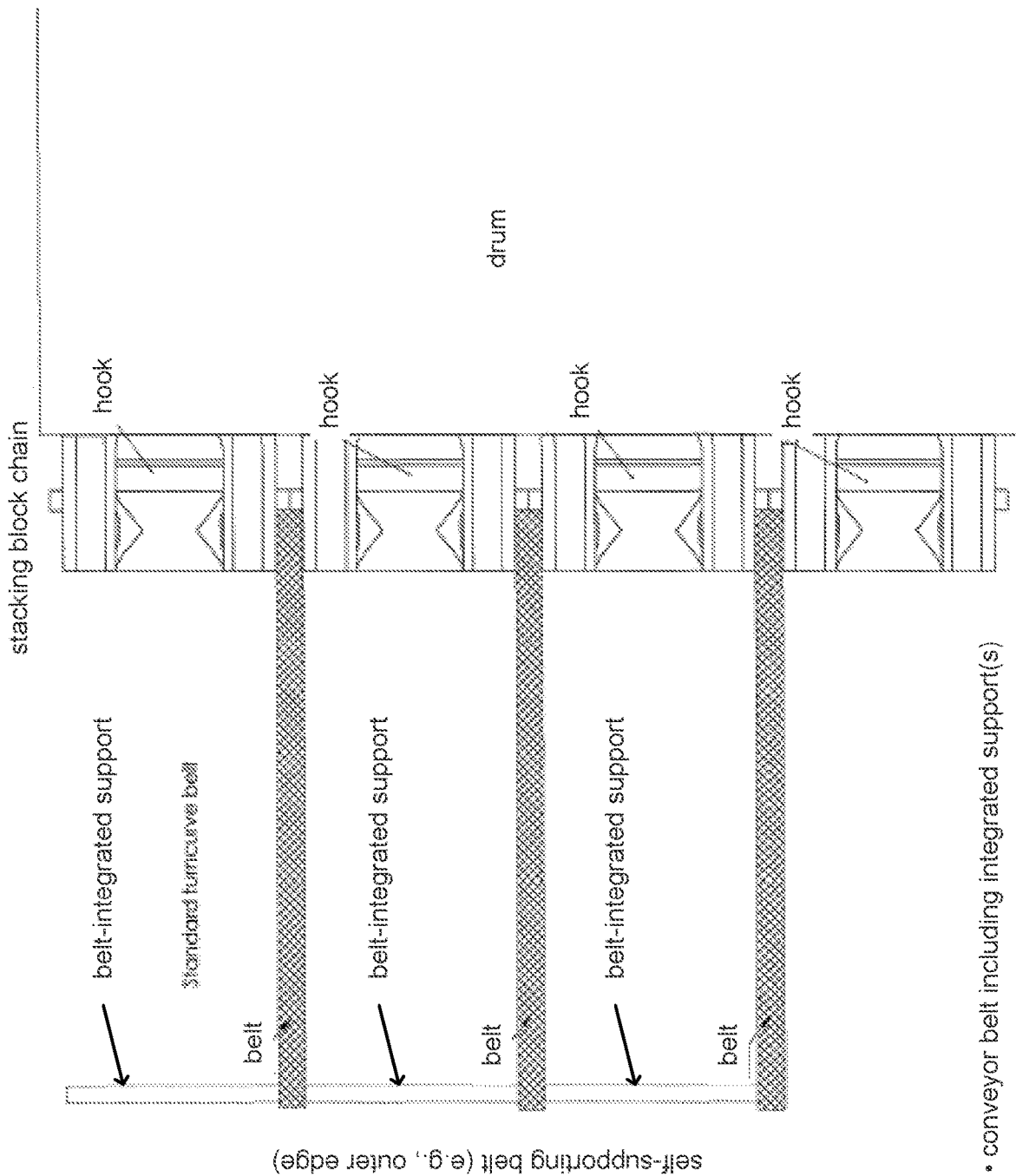
FIG. 14 illustrates an embodiment of a conveyor belt, including integrated support(s), with stacked levels of a block chain.

FIG. 14 illustrates an embodiment 1400 of a conveyor belt, including integrated support(s), with stacked levels of a block chain. As may be understood with respect to this diagram, the conveyor belt itself includes an integrated support along at least a portion of one of the lengthwise edges of the conveyor belt. This lengthwise edge may be viewed as being opposite from the lengthwise edge of the conveyor belt that is operative to be interacting with the block chain in conjunction with the drum assembly. In one embodiment, the conveyor belt may be implemented as an outer edge self-supporting belt (e.g., where the conveyor belt is driven using an inner lengthwise edge). Alternatively, the conveyor belt may be implemented as an inner edge self-supporting belt (e.g., where the conveyor belt is driven using an outer lengthwise edge in such an alternative embodiment). Generally speaking, such support(s) may be located anywhere along the conveyor belt (e.g., not restricted solely to a lengthwise edge). For example, some embodiments may include such support(s) more centrally located as opposed to only along one of the lengthwise edges (e.g., generally anywhere along a flat portion of the conveyor belt to provide support for another portion of the conveyor belt above and/or below the location of the support (s), including on a top and/or bottom side of the conveyor belt to provide support above or below).

As may be understood with respect to this diagram, such an implementation obviates the need for any supports of the conveyor belt when interacting with the block chain in conjunction with the drum assembly. For example, given that such support is integrated with the conveyor belt itself, there is no need for additional supports along the width of the conveyor belt to ensure stabilization of the conveyor belt when interacting with the block chain in conjunction with the drum assembly. Such an implementation may be viewed as a self-supporting system that does not require the use of additional supports along the width of the conveyor belt.

Moreover, it is noted that while many implementations and embodiments of a conveyor belt interacting with a block chain in conjunction with the drum assembly are presented herein and described as the block chain helically wrapping around a drum assembly along an inner edge of the conveyor belt, it is also noted that such interaction may be along an outer edge of the conveyor belt. That is to say, such an appropriately implemented outer edge stacker may be implemented without departing from the scope and spirit of the invention. For example, the mechanical interaction of the block chain with the drum assembly may instead be on the opposite lengthwise edge of the conveyor belt in comparison to many of the implementations and embodiments described herein.

Generally speaking, as also may be understood with respect to various embodiments and implementations herein, engagement of a conveyor belt within such a novel system as presented herein may be viewed as being performed in a number of different ways including via compression, via mechanical engagement, via a combination of compression and mechanical engagement, etc.

A variety of different embodiments of block chains, respective links thereof, etc. have been presented herein. Generally speaking, any desired such embodiment of block chain, links thereof, etc., such as in accordance with various aspects, and their equivalents, of the invention, may be employed within any desired conveyor belt system including a spiral conveyor belt system.

It is again noted that while at least one preferred embodiment is implemented in accordance with a spiral conveyor belt system, various aspects, and their equivalents, of the invention may be generally applied to any of a wide variety of types of conveyor belt systems. For example, within a non-spiral conveyor belt system, a particular portion of such an overall conveyor belt system may be implemented such that a block chain may be in continuous contact with at least a portion of a conveyor belt above and/or below for effectuating direct engagement of the conveyor belt and driving the conveyor belt through the overall conveyor belt system. One such possible implementation by which such continuous contact between a block chain and at least a portion of a conveyor belt may be made is in accordance with a spiral conveyor belt system, though it is again noted that such in accordance with aspects, and their equivalents, of the invention may be generally applied to any of a wide variety of types of conveyor belt systems.

Also, it is noted that while various diagrams and/or embodiments herein are directed towards the description of as few as one conveyor belt system which may include as few as one spiral conveyor portion thereof, it is noted that a given conveyor belt system may include multiple spiral conveyor portions therein. For example, a singular conveyor belt system may include more than one spiral conveyor portion therein, such that each respective spiral conveyor portion may be particularly adapted and tailored for different respective processing, such as with respect to other various aspects, and their equivalents, of the invention including those as described with reference to FIG. 2. Alternatively, multiple respective conveyor belt systems may also be implemented and cooperatively operative with one another, such that product is transported at one or more appropriate locations from one conveyor belt system to another within an overall multi-conveyor belt system design. Any one or more of the respective conveyor belt systems within such an overall multi-conveyor belt system design may include one or more spiral conveyor portions therein.

As may be used herein, the terms "substantially" and "approximately" provide an industry-accepted tolerance for its corresponding term and/or relativity between items. Such an industry-accepted tolerance ranges from less than one percent to fifty percent. Such relativity between items ranges from a difference of a few percent to magnitude differences.

The present invention has been described herein, at least in part, with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, and components herein, can be implemented as illustrated or alternatively to effectuate corresponding operation thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A multiple conveyor belt system, the system comprising:
   a first conveyor belt system configured to convey a product along a first pathway; and
   a second conveyor belt system configured to convey the product along a second pathway that is different from the first pathway including to receive the product from the first conveyor belt system after the product has been conveyed along the first pathway, wherein second conveyor belt system including:
   a drum assembly that includes a plurality of drum bars;
   a block chain configured to engage at least one of the plurality of drum bars and to be driven by the drum assembly in a direction when the drum assembly rotates about an axis in a rotational direction; and
   a conveyor belt configured to:
     be driven based on the direction at or during a time period when in continuous contact with at least one portion of the block chain when the block chain engages the at least one of the plurality of drum bars and is driven by the drum assembly in the direction.

2. The system of claim 1 further comprising:
   a motor configured to rotate the drum assembly; and
   the block chain including a plurality of links, wherein at least one of the plurality of links has a hook or protrusion configured to engage the at least one of the plurality of drum bars directly so that the block chain is driven in the direction by the drum assembly when the drum assembly rotates about the axis in the rotational direction.

3. The system of claim 1 further comprising:
   the direction includes a first direction;
   the rotational direction includes a first rotational direction;
   the time period includes a first time period;

the block chain configured to engage the at least one of the plurality of drum bars and to be driven by the drum assembly in the first direction when the drum assembly rotates about the axis in the first rotational direction and in a second direction that is different than the first direction when the drum assembly rotates about the axis in a second rotational direction; and the conveyor belt configured to:
be driven based on the first direction at or during the first time period when in continuous contact with the at least one portion of the block chain when the block chain engages the at least one of the plurality of drum bars and is driven by the drum assembly in the first direction; and be driven based on the second direction at or during a second time period that is different than the first time period when in continuous contact with the at least one portion of the block chain or at least one other portion of the block chain when the block chain engages the at least one of the plurality of drum bars and is driven by the drum assembly in the second direction.

4. The system of claim 1, wherein the block chain is fabricated of at least one of polyethylene material, ultrahigh molecular weight (UHMW) plastic, or food grade nonporous plastic.

5. The system of claim 1 further comprising:
the block chain including a plurality of links, wherein at least one of the plurality of links has a first tab on a top thereof and a second tab on a bottom thereof such that the first tab and the second tab are configured to prevent at least one portion of the conveyor belt from contacting at least one of the plurality of drum bars.

6. The system of claim 1, wherein the block chain is further configured to:
drive the conveyor belt through a first processing region based on a first processing operation that includes at least one of heating, cooling, drying, freezing, or airflow; and
drive the conveyor belt through a second processing region based on a second processing operation that includes at least one of the heating, the cooling, the drying, the freezing, or the airflow.

7. The system of claim 1, wherein the block chain and the conveyor belt are alternatively and vertically stacked, and the conveyor belt includes a plurality of integrated supports implemented along at least one portion of the conveyor belt and configured to maintain separation between stacked layers of the conveyor belt.

8. The system of claim 1, wherein the product includes at least one of an article of manufacture or a food component.

9. A multiple conveyor belt system, the system comprising:
a first conveyor belt system configured to convey a product that includes at least one of an article of manufacture or a food component along a first pathway; and
a second conveyor belt system configured to convey the product along a second pathway that is different from the first pathway including to receive the product from the first conveyor belt system after the product has been conveyed along the first pathway, wherein second conveyor belt system including:
a drum assembly that includes a plurality of drum bars;
a block chain configured to engage at least one of the plurality of drum bars and to be driven by the drum assembly in a direction when the drum assembly rotates about an axis in a rotational direction; and
a conveyor belt configured to:
be driven based on the direction at or during a time period when in continuous contact with at least one portion of the block chain when the block chain engages the at least one of the plurality of drum bars and is driven by the drum assembly in the direction;
a motor configured to rotate the drum assembly; and
the block chain including a plurality of links, wherein at least one of the plurality of links has a hook or protrusion configured to engage the at least one of the plurality of drum bars directly so that the block chain is driven in the direction by the drum assembly when the drum assembly rotates about the axis in the rotational direction.

10. The system of claim 9 further comprising:
the direction includes a first direction;
the rotational direction includes a first rotational direction;
the time period includes a first time period;
the block chain configured to engage the at least one of the plurality of drum bars and to be driven by the drum assembly in the first direction when the drum assembly rotates about the axis in the first rotational direction and in a second direction that is different than the first direction when the drum assembly rotates about the axis in a second rotational direction; and the conveyor belt configured to:
be driven based on the first direction at or during the first time period when in continuous contact with the at least one portion of the block chain when the block chain engages the at least one of the plurality of drum bars and is driven by the drum assembly in the first direction; and be driven based on the second direction at or during a second time period that is different than the first time period when in continuous contact with the at least one portion of the block chain or at least one other portion of the block chain when the block chain engages the at least one of the plurality of drum bars and is driven by the drum assembly in the second direction.

11. The system of claim 9, wherein the block chain is fabricated of at least one of polyethylene material, ultrahigh molecular weight (UHMW) plastic, or food grade nonporous plastic.

12. The system of claim 9 further comprising:
the block chain including a plurality of links, wherein at least one of the plurality of links has a first tab on a top thereof and a second tab on a bottom thereof such that the first tab and the second tab are configured to prevent at least one portion of the conveyor belt from contacting at least one of the plurality of drum bars.

13. The system of claim 9, wherein the block chain is further configured to:
drive the conveyor belt through a first processing region based on a first processing operation that includes at least one of heating, cooling, drying, freezing, or airflow; and
drive the conveyor belt through a second processing region based on a second processing operation that includes at least one of the heating, the cooling, the drying, the freezing, or the airflow.

14. The system of claim 9, wherein the block chain and the conveyor belt are alternatively and vertically stacked, and the conveyor belt includes a plurality of integrated supports implemented along at least one portion of the conveyor belt and configured to maintain separation between stacked layers of the conveyor belt.

15. A method for execution by a multiple conveyor belt system, the method comprising:
operating a first conveyor belt system configured to convey a product along a first pathway; and
operating a second conveyor belt system configured to convey the product along a second pathway that is different from the first pathway including to receive the product from the first conveyor belt system after the product has been conveyed along the first pathway, wherein second conveyor belt system including:
rotating a drum assembly that includes a plurality of drum bars;
engaging at least one of the plurality of drum bars by a block chain to drive the drum assembly in a direction when the drum assembly rotates about an axis in a rotational direction; and
driving a conveyor belt:
based on the direction at or during a time period when in continuous contact with at least one portion of the block chain when the block chain engages the at least one of the plurality of drum bars and is driven by the drum assembly in the direction.

16. The method of claim 15 further comprising:
operating a motor that is configured to rotate the drum assembly; and wherein:
the block chain including a plurality of links, wherein at least one of the plurality of links has a hook or protrusion configured to engage the at least one of the plurality of drum bars directly so that the block chain is driven in the direction by the drum assembly when the drum assembly rotates about the axis in the rotational direction.

17. The method of claim 15, wherein:
the direction includes a first direction;
the rotational direction includes a first rotational direction;
the time period includes a first time period; and further comprising:
engaging the at least one of the plurality of drum bars by the block chain to drive the drum assembly in the first direction when the drum assembly rotates about the axis in the first rotational direction and in a second direction that is different than the first direction when the drum assembly rotates about the axis in a second rotational direction; and
driving the conveyor belt:
based on the first direction at or during the first time period when in continuous contact with the at least one portion of the block chain when the block chain engages the at least one of the plurality of drum bars and is driven by the drum assembly in the first direction; and
based on the second direction at or during a second time period that is different than the first time period when in continuous contact with the at least one portion of the block chain or at least one other portion of the block chain when the block chain engages the at least one of the plurality of drum bars and is driven by the drum assembly in the second direction.

18. The method of claim 15, wherein the block chain including a plurality of links, wherein at least one of the plurality of links has a first tab on a top thereof and a second tab on a bottom thereof such that the first tab and the second tab are configured to prevent at least one portion of the conveyor belt from contacting at least one of the plurality of drum bars.

19. The method of claim 15 further comprising:
driving the conveyor belt through a first processing region based on a first processing operation that includes at least one of heating, cooling, drying, freezing, or airflow; and
driving the conveyor belt through a second processing region based on a second processing operation that includes at least one of the heating, the cooling, the drying, the freezing, or the airflow.

20. The method of claim 15, wherein the block chain and the conveyor belt are alternatively and vertically stacked, and the conveyor belt includes a plurality of integrated supports implemented along at least one portion of the conveyor belt and configured to maintain separation between stacked layers of the conveyor belt.

* * * * *